US007805136B1

(12) United States Patent
Everson et al.

(10) Patent No.: US 7,805,136 B1
(45) Date of Patent: Sep. 28, 2010

(54) AUTOMATED FORM-BASED FEEDBACK OF WIRELESS USER EXPERIENCES ACCESSING CONTENT, E.G., WEB CONTENT

(75) Inventors: John M. Everson, Kansas City, MO (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1193 days.

(21) Appl. No.: 11/399,743

(22) Filed: Apr. 6, 2006

(51) Int. Cl.
*H04W 24/00* (2009.01)
*H04W 4/00* (2009.01)
(52) U.S. Cl. .................. 455/423; 455/426.1; 370/338
(58) Field of Classification Search .............. 455/456.1, 455/456.3, 456.5; 709/217, 218
See application file for complete search history.

(56) References Cited

U.S. PATENT DOCUMENTS

| 5,740,354 | A | 4/1998 | Ben-Natan et al. ..... 395/183.21 |
| 5,790,779 | A | 8/1998 | Ben-Natan et al. ..... 395/183.15 |
| 6,842,782 | B1 | 1/2005 | Malik et al. .................. 709/224 |
| 7,003,433 | B2 | 2/2006 | Yemini et al. ............... 702/183 |
| 2006/0007901 | A1* | 1/2006 | Roskowski et al. .......... 370/338 |
| 2006/0084428 | A1* | 4/2006 | Lee ............................ 455/423 |

* cited by examiner

*Primary Examiner*—Charles N Appiah
*Assistant Examiner*—Kiet Doan (57) ABSTRACT

A computer system receives communications from wireless communications devices reporting on problems with communications with content servers on a network such as application servers or web site servers. The central computer system generates reports summarizing the reported problems. Such summary reports can be used internally by a wireless service provider or made available to the proprietor of the content server. The wireless communications devices include an interactive application that facilitates generation of a report and transmission of the report to the computer system. In one embodiment, the computer system is managed by a provider of wireless communications services.

11 Claims, 6 Drawing Sheets

ERROR COMMUNICATION REPORT

URL: www.travelagent.com — 202

200 →

DATE: 09/12/05 — 204

DEVICE: SAMSUNG MODEL X215 — 206

PROBLEMS: — 208

| | | |
|---|---|---|
| 404 ERRORS: | 135 | DETAILS |
| LOGIN ERRORS: | 2 | DETAILS |
| DISPLAY/RESOLUTION: | 5 | DETAILS |
| OTHER: | 210 | DETAILS |

DEVICE: SPRINT PCS MODEL XYZ

PROBLEMS: — 212

| | | |
|---|---|---|
| 404 ERRORS: | 0 | DETAILS |
| LOGIN ERRORS: | 2,159 | DETAILS |
| DISPLAY/RESOLUTION: | 0 | DETAILS |
| OTHER: | 1,530 | DETAILS |

SPRINT PCS MODEL XYZ

OTHER ERRORS

UNABLE TO DOWNLOAD CONTENT: 1530

| | |
|---|---|
| BROWSER VERSION #1 | 812 |
| BROWSER VERSION #2 | 582 |
| BROWSER VERSION #3 | 146 |
| BROWSER VERSION #4 | 0 |
| BROWSER VERSION #5 | 0 |

FIG. 7

AUTOMATED FORM-BASED FEEDBACK OF WIRELESS USER EXPERIENCES ACCESSING CONTENT, E.G., WEB CONTENT

BACKGROUND

A. Field

This invention relates generally to the field of wireless communication and more particularly to methods by which wireless communications devices access content from a content server (e.g., web server or application server) on a packet switched network. The invention further relates to methods for facilitating the identification and/or reporting of communications problems that users of wireless devices experience when communicating with a content server.

B. Related Art

Wireless communication devices, such as cell phones and wirelessly equipped computing devices such as personal digital assistants (PDAs) and laptop computers, can be configured with appropriate hardware and software so as to be able to engage in wireless packet-data communications and to thereby access a content server on a network such as the Internet. The content server can take a variety of forms, such as a web server responding to web page requests or an application server. A wireless service provider, for instance, may provide a radio access network and packet-data serving node (PDSN) that cooperatively establish wireless packet-data connectivity between a wireless device and a packet-switched network such as the Internet or a private packet network.

In usual practice, a wireless device initiates acquisition of a packet-data connection by sending a packet-data origination message over an air interface access channel to the carrier's radio access network. In response, the radio access network then assigns an air-interface traffic channel for use by the device, and the network signals to a PDSN or other gateway, which negotiates with the device to set up a data link layer connection. In addition, the gateway or a mobile-IP home agent assigns an Internet Protocol (IP) address for use by the device to engage in packet-data communications. The device may then communicate with other entities on the packet-switched network in much the same way as a traditional personal computer would, except that the device would communicate over a wireless air interface and via the radio access network. One type of such communication is web browsing and downloading of content or applications from a web server on a packet switched network.

Despite the advent of the Mobile-IP protocol and communications technology allowing for web browsing using wireless devices, error conditions in wireless web browsing can and do still occur. For example, in the wireless world, when a user operates a wireless web browser (such as a web browser on a wireless handheld device like a Treo™ or web-capable cell phone), the user may encounter various types of problems/conditions that can get in the way of successful acquisition and presentation of content, such as a web page. Some of the problems/conditions are specific to the wireless, mobile, and/or handheld nature of typical wireless web browsing. Further, such problems may be browser-specific problems.

Because such communications problems can and do occur, they interfere with or negatively influence the user's web browsing experience. Such problems reflect badly on both the web site proprietor and the wireless service provider. Similarly, when a wireless device experiences problems accessing content from an application server the problems reflect badly on the application proprietor. This invention addresses this problem and provides for methods and apparatus for reporting error conditions experienced by a plurality of distributed wireless devices.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments one or more of the above-described problems have been reduced or eliminated, while other embodiments are directed to other improvements. Furthermore, the network aspects of this disclosure are offered by way of example and not limitation. For example, the manner in which a wireless device accesses a content server may include EvDo (Evolution Data Only) wireless communication technology providing high speed data connections to a network.

In a first aspect, a method collecting feedback on user experiences in accessing content on a network via a wireless communications device. The content server may be a web server or an application server. The method includes a step of receiving a plurality of communications from a plurality of distributed wireless communications devices which basically comprise reports of user problems in accessing a content server (e.g., web server or application server). Each communication includes at least (a) identification information as to wireless communication device, (b) information as to a communication problem occurring when the wireless communication device communicated with the content server, and (c) information identifying the content server, such as a URL, IP address, etc. Methods and features for assisting a wireless user to provide such reporting communications are described in further detail below.

In one embodiment, the reporting communications are received and stored in a computer system. The system may be implemented by a wireless service provider, e.g., Sprint Nextel, or any entity the service provider may designate to receive such reports.

The method may further include an optional step of providing a summary report from the wireless service provider to the proprietor of the content server containing basically a log of information a) and b) received from a plurality of devices. The purpose of the report will typically be to facilitate awareness of problems the proprietor may not know about, and facilitate fixes for the problems. The report may be provided for a fee, or may be provided free of charge. In one variation, the report is provided automatically to the proprietor of the content server, e.g., on a weekly or monthly basis.

In another variation, regardless of whether a report is provided to the proprietor of the content server, a report is generated for internal use by the wireless service provider, e.g., to diagnose problems with their network, to prompt the development of new features or services for devices using the services of the provider, and potentially reduce the incidence of such problem reporting.

In a second aspect, an improved wireless communications device is provided. The device has a processing unit executing machine-readable instructions stored in a memory, and is configured for Internet web browsing. The improvement comprises providing instructions in the device for facilitating reporting communication problems to a computer system remote from the wireless communications device, wherein the communication problems that are reported comprise problems occurring when the wireless communications device interacts with a content server.

In a still further aspect, an improvement to a wireless service provider system is provided, comprising a computer system receiving and storing communications from a plurality of distributed wireless communications devices, the communications reporting on communications problems occurring when the wireless communications devices communicate with one or more content servers. In one variation, the computer system further comprises software for processing the communications to thereby generating a report for a proprietor of at least one of the one or more content servers, the report indicating problems wireless communications devices are experiencing when communicating with the content server of the proprietor. In one further variation, the computer system prepares a report (e.g., summary) of the problems and such report is used internally by a wireless service provider.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF PREFERRED EMBODIMENT

Figure 1:
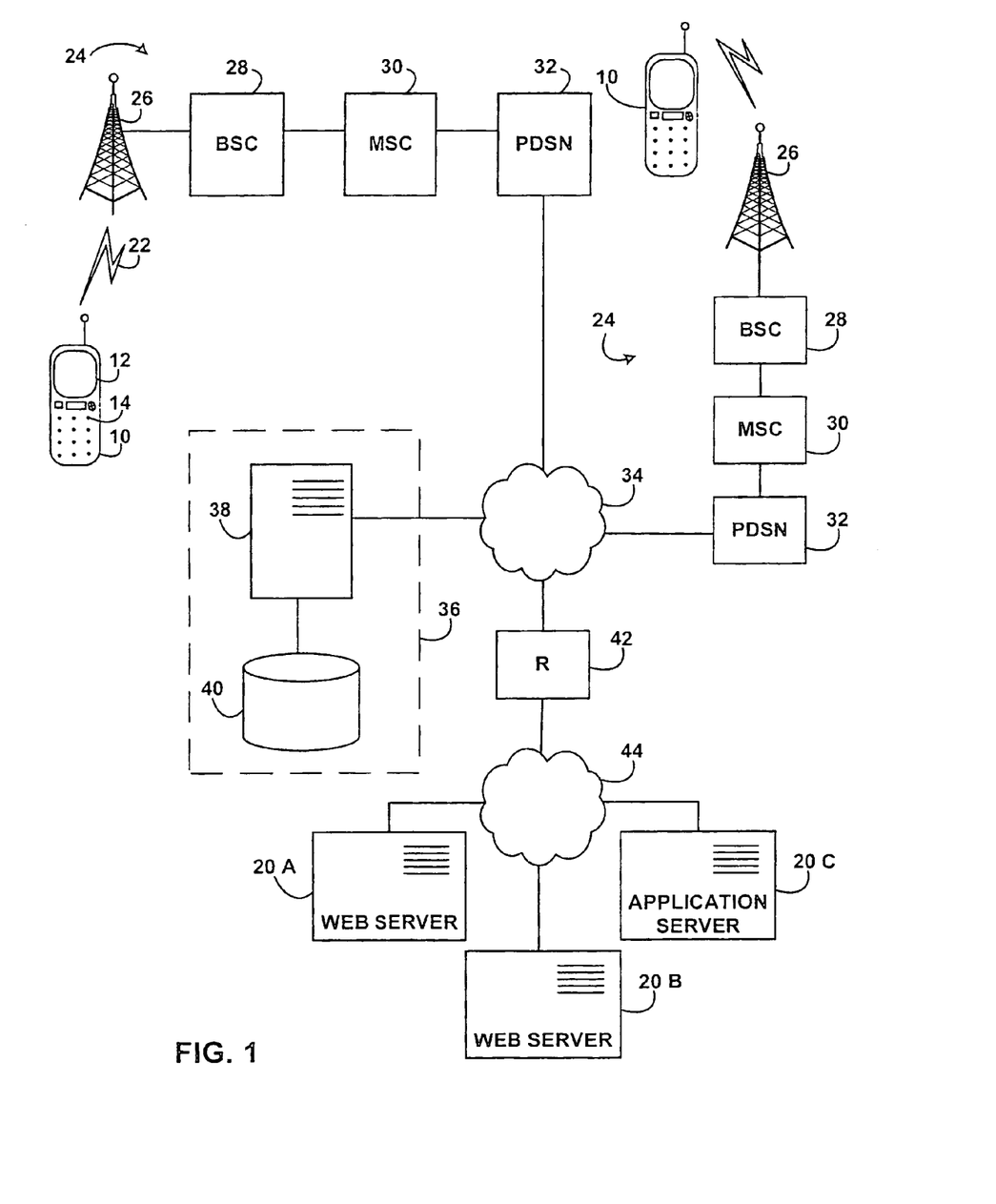
FIG. 1 is an illustration of wireless service provider system including a radio access network and computer system which acts as a central facility receiving reports of communications problems experienced by subscriber wireless communications devices when they access content sites hosted by web servers or application servers.

FIG. 1 is an illustration showing the elements of a communication system which facilitates communication between a plurality of distributed wireless communications devices 10 and content servers, in this example web servers 20A, 20B and an application server 20C. The wireless communication devices 10 may take the form of any portable electronic device, such as cell phone, PDA or laptop computer, which is configured with hardware and software for Internet web browsing. Such devices are known in the art. The devices 10 typically are configured with a display 12 and plurality of buttons or keys 14 for entry of commands or text into the device, to dial a phone number, or otherwise operate the software loaded onto the device 10. The devices typically include a central processing unit and memory (not shown) storing machine executable instructions, including a web browser, operating system, phone application, email application, etc.

The communications system of FIG. 1 includes a radio access network 24 provided by a wireless service provider (e.g., Sprint Nextel, Verizon, AT&T, Cingular) which is coupled to a service provider backbone packet switched network 34. The radio access network 24 provides a means for radio frequency communication with the wireless devices 10, and may take the form of a CDMA spread spectrum cellular telephony network. The radio access network 24 includes a plurality of base station antennas 26, each of which is coupled to a base station controller 28, a mobile switching center 30 and a packet data servicing node 32 coupling the radio access network to the backbone network 34. These entities are known in the cellular telephony art and therefor a detailed description is omitted for the sake of brevity. As noted earlier, other networking technologies including EvDo are possible and the illustration of FIG. 1 is offered by way of example and not limitation.

Only two wireless devices 10 are shown, but of course the system of FIG. 1 may be deployed over a wide geographic area, such as the continental United States, and the wireless service provider will typically provide radio access network infrastructure 24 so as to provide for cell phone coverage for millions of subscribers over the wide geographic area.

The service provider network 34 may include one or more routers 42 which couple the network 34 to one or more intermediate packet switched networks 44 making up the Internet. Three content servers 20A, 20B and 20B are shown, web servers 20A and 20B representing two web page servers for two different web sites. The proprietors (or managers) of the web servers are typically unrelated to the wireless service provider or to each other, and may comprise corporations, non-profit groups, governmental agencies, individuals, etc. The web servers host content or information that is available for viewing as a web page or for download by wireless communications devices 10 over the radio access network 24, network 34 and Internet 44, e.g., using HTTP or other protocols. Similarly, application server 20C providing content for a wireless communication device 10 may be managed and operated by an independent proprietor.

The wireless service provider includes a computing system 36 (which may be centralized or distributed) which operates to receive reports of communications problems when subscriber wireless devices 10 experience problems when communicating with the content servers 20A-20C. The computing system could take on a variety of forms and the architecture or implementation of the system 36 is not particularly important. In the example of FIG. 1, the system takes the form of a network server 38 coupled to the network 34 and a database 40 for storing the data received from distributed wireless devices 10. The server 38 is configured with a central processing unit and software for performing the functions described herein.

Example problems/conditions that the users of the devices 10 may experience include the following error conditions:

(1) The device 10 screen size may be incompatible with the content downloaded from the servers 20A-20C. For instance, if the web page is not structured for presentation on a small handheld display screen, only part may show at a time, or elements of the page may be positioned improperly.

(2) Graphics or other web content may be too large to download quickly enough and may thus cause the device (e.g., web browser) to time out or otherwise cause the download to fail.

(3) The web site being accessed, or one or more elements of the site (or content being downloaded), require special application logic in the browser or otherwise on the device, and the browser/device does not have that application logic. For instance, a web site might require the browser to run scripting/login code to enable a user to login to the site; the browser might not have such scripting/login code, and so the user may be unable to get to the site.

(4) In some instances when a web communication problem occurs, an error code, such as an HTTP "404" error code, might be displayed on the screen, such as when the user attempts to access an invalid web site.

(5) In other instances, as in some of the examples above, the web communication may succeed in some way, shape or form, but may not be to the satisfaction of the user, for example due to improper display of graphics or inability to access all the features of the web site.

The type of problems that are encountered often differ from device to device due to the vast number of different years, makes and models of wireless devices on the market, and different versions of browser software employed by such devices.

In accordance with a first aspect of this invention, communications reporting errors or problems in accessing content from a content server are collected directly from the wireless devices 10. Such communications are preferably collected at the computing system 36. Such communications received from the devices 10 includes at least (a) identification information as to wireless communication device, such as the year, make and model of the device, web browser version, ID information such as Electronic Serial Number, cell cite and cell sector where the device is located at the time of the problem, etc., (b) information as to a communication problem occurring when the wireless communication device communicated with the content server, and (c) information identifying the content server, such as a URL, IP address, etc.

Such communications may be collected over a period of time and used to analyze problems that are occurring and development of fixes to such problems. Such communications can be summarized in reports. Such reports can be used internally by the wireless service provider, or provided as feedback to the proprietor of the content server.

Thus, for example, in one embodiment, a method of providing feedback to web site proprietor (operator of a web server 20A, 20B) is described, comprising a first step of receiving a plurality of communications from a plurality of distributed wireless communications devices 10, each communication including at least (a) identification information as to wireless communication device, such as the year, make and model of the device, web browser version, ID information such as Electronic Serial Number, cell cite and cell sector where the device is located at the time of the problem, etc., (b) information as to a communication problem occurring when the wireless communication device communicated with a web site, and (c) information identifying the web site. In preferred embodiments, the wireless devices 10 include a client application which the user may invoke to report a communication problem (identifying the device, the web site with which the problem occurred, and a description of the problem), and automatically transmit the communication to the central computer system 36. The communications from the devices 10 are stored in the database 40.

The method further includes a step of making available a report to a proprietor of the web site containing the identification information and the description of the problem. Such reports may be furnished to the web site proprietors on a periodic basis, and may be furnished in either electronic or paper format.

This invention has usefulness in that by collecting such reports and providing them to the web site proprietor, both the wireless carrier and the web site proprietor have the knowledge that users are experiencing particular problems, at particular times, and using particular devices with particular web browsers. Moreover, by providing detailed information about the devices in the communications to the central compute system 36 and in the reports, such as detailed make and model information, browser version, location, time, etc., the web site proprietor and/or the wireless service provider may be more able to solve the problems. Otherwise, the wireless service provider or content proprietor would not know why the users are having the problem, or the provider or content proprietor might not know enough about the particular problem. By allowing users to readily report web communication problems like this, both the service provider and the content proprietor can work to improve the user experience.

In preferred embodiments, the receiving of the reports from the wireless communications devices 10 is performed by a provider of wireless communications services or its designee. The receiving of the reports is preferably handled by a computer system 36 including a server 28 and a database 40 as shown in FIG. 1. However, it would be possible to have such reports collected by a designated independent entity in a less preferred embodiment. Preferably, the "complaint" communications from the wireless devices are collected by a central facility (system 36) rather than communicated directly by the wireless devices to the content site proprietors.

As the system 36 will typically be collecting reports from a distributed base of thousands or millions of wireless devices, it will eventually have enough data for particular web sites (or application content server sites) such that it is advantageous to make a summary report of the web site specific problems to the proprietors of the content sites. In one embodiment, the generation of a summary report is triggered when the number of communications from wireless communications reporting on problems occurring with the web site exceeds a predetermined threshold, e.g., 100 or 1000 "complaints". Alternatively, the reports could be furnished on a periodic basis, such as daily, weekly or monthly, regardless of the number of "complaints."

In preferred embodiments, the information provided in the summary report is of sufficient detail that it facilitates the web site proprietor to understand the nature of the problems that are being reported. As one example, the reports comprises at least one of: (1) the year, make or model of a wireless device reporting a problem, (2) the time the problem occurred, (3) the location of the wireless device when the problem occurred, e.g., as cell and sector or by geographic location, (4) the number of occurrences of a type of communication problem, and (5) the browser (or browser version) of each wireless device reporting a problem. Obviously, in order to provide such detail in the report to the web site proprietor, such information must be collected from the wireless devices when they report the communication problems to the computer system 36. Therefore, when problems are reported to the computer system 36, it is recommended to obtain detailed information as to both the device having the problem and the nature of the problem. Some information, such as location (e.g., cell and sector data) may be of interest only to the wireless service provider and need not be forwarded to the content site proprietor. Other information may be of interest only to the content site proprietor.

To facilitate the collection of detailed information on content site communication problems and reporting to central system 36, another aspect of this disclosure is an improved wireless communications device which includes a client application resident on the wireless communications device 10 in the form of instructions for facilitating reporting communication problems to a computer system 36 remote from the wireless communications device. The communication problems that are reported comprise problems occurring when the wireless communications device 10 interacts with a web server or web site.

In a preferred embodiment, described in more detail below, the instructions comprise an interactive application displaying a form on a screen display 12 of the device 10, whereby the user of the device 10 may indicate on the form the type of communication problem that occurred. The form may include a description of predetermined types of problems, and a facility whereby a user may select one of the types of problems. Examples of such predetermined types of problems could be (a) web site nonresponsiveness, (b) inability to login, and (c) display or resolution problems. The form may also have a text box where the user can enter text describing the problem.

After designating or entering the problem that occurred, the user may then activate a "submit" function and the application automatically retrieves device and status information, such as the serial number of the device, year make and model, browser version, time, location, and other information, and then automatically transmit the report to the central system 36. Again, location information (e.g., in the form of cell and cell sector data) may or may not be important to the content site proprietor, but in one embodiment is included nevertheless in the report.

The report of a communication problem preferably will include specific information regarding the device to facilitate diagnosis and correction of the problem by the web site proprietor. For example, the wireless device will store in memory certain information such as the device serial number, year, make or model of the wireless device, the browser used by the wireless device, and such data will be retrieved from memory and included in the report. The report will also include preferably the time the problem occurred, the location of the wireless device when the problem occurred (if such information is available), the address of web site (either as a URL or IP numeric address), and information identifying a cell or sector in a radio access network the wireless device was communicating with at the time the problem occurred.

The transport mechanism by which the report is sent to the computer system 36 (FIG. 1) receiving such reports can vary. In one embodiment, Short Message Service (SMS) is used. Other possibilities exist, such as for example sending the "complaint" and associated data as an email message where the message is retrieved by the system 36.

In a still further aspect, an improvement to a wireless service provider system is described herein. The improvement comprises a computer system 36 receiving and storing communications from a plurality of distributed wireless communications devices 10, the communications reporting on communications problems occurring when the wireless communications devices 10 communicate with one or more web sites (hosted by web servers 20A-20C). The computer system further comprises software (e.g., software resident in a network server 38, for processing the communications to thereby generate a report for a proprietor of at least one of the one or more web sites, the report indicating problems wireless communications devices are experiencing when communicating with the web site of the proprietor. Such software may take the form of a simple sorting routine operable on the database 40 which stores the communications from the wireless devices. Such routine essentially sorts the communications by URL or web site address, collects all the communications for a particular URL, and then formats or organizes the data in such communications in a convenient fashion. Examples are discussed below in conjunction with FIGS. 6, and 7.

As the system 36 of FIG. 1 is receiving potentially hundreds or thousands of communications from the distributed devices 10, and such communications may deal with hundreds or even thousands of content sites, it will be appreciated that the computer system may operate to generate a multitude of reports, each one for a different content site proprietor, and each report containing information relating to communication problems reported by wireless communications devices of a particular content site, e.g., web site.

EXAMPLES

With the above concepts in mind, a few representative and non-limiting examples of how the above system may operate will now be explained in conjunction with FIGS. 2-7. It will be appreciated that the wireless device user interface and report features of FIGS. 2-7 are intended to represent but one of many possible examples, and thus are not limiting in scope.

Figure 2:
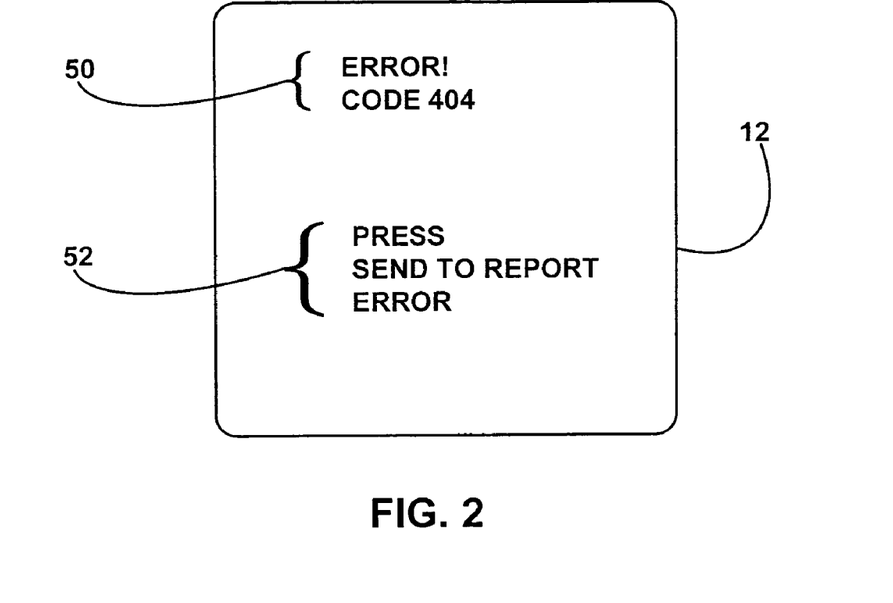
FIG. 2 is a representative screen display of a wireless communications device showing one type of error or problem in communication with a web server of FIG. 1.

FIG. 2 is a representative screen display 12 of a wireless communications device which may occur when they experience one type of error or problem in communication with a web server of FIG. 1. Suppose for example a user accesses a web site hosted by web server 20A, sends an HTTP "get" message to download content, and web server 20A becomes non-responsive. The display 12 of the device 10 may then detect such condition and present a message 50 indicating that an error condition exists. The device includes a client application (e.g., JAVA client application) which is provided with instructions for presenting on the display a second message 52 which prompts the user to take a specific action if they wish to report the error to the wireless service provider. For example, the user may be prompted to press <send>, or some other key or button, to trigger the reporting process.

Figure 3:
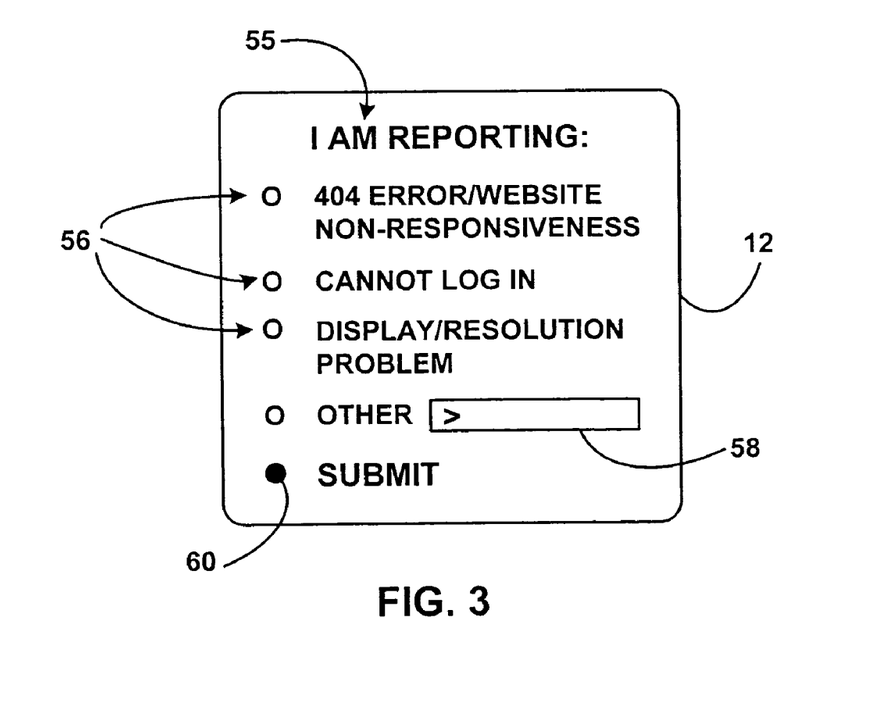
FIG. 3 is an illustration of a form that appears on the display of FIG. 2 when the user has indicated that they wish to send a report of the communication problem.

Suppose the user of the device presses <send> to trigger sending a report. The client application causes display 12 to revert to the display of FIG. 3. FIG. 3 is an illustration of a display, which can be considered a "form", which displays predetermined categories of communications errors or problems as indicated at 55. The user toggles through the displayed conditions 56 to select the one that is applicable to the current situation and then activates the "submit" function 60 to cause the selected problem to be reported. In the example of the error of FIG. 2, the user would toggle to the first listed condition "404 Error/website non-responsiveness", press "send", and then toggle down to the submit icon 60 and activate the icon. (Of course, the specific instrumentalities for selection of a problem and triggering a submit function may vary from the disclosed example).

If the error condition that was experienced was not in the list 56 of predetermined error types, the user can toggle to the text entry box 58, type in a description of the problem (assuming the device is equipped with typing functionality) and then activate the submit icon 60.

Figure 4:
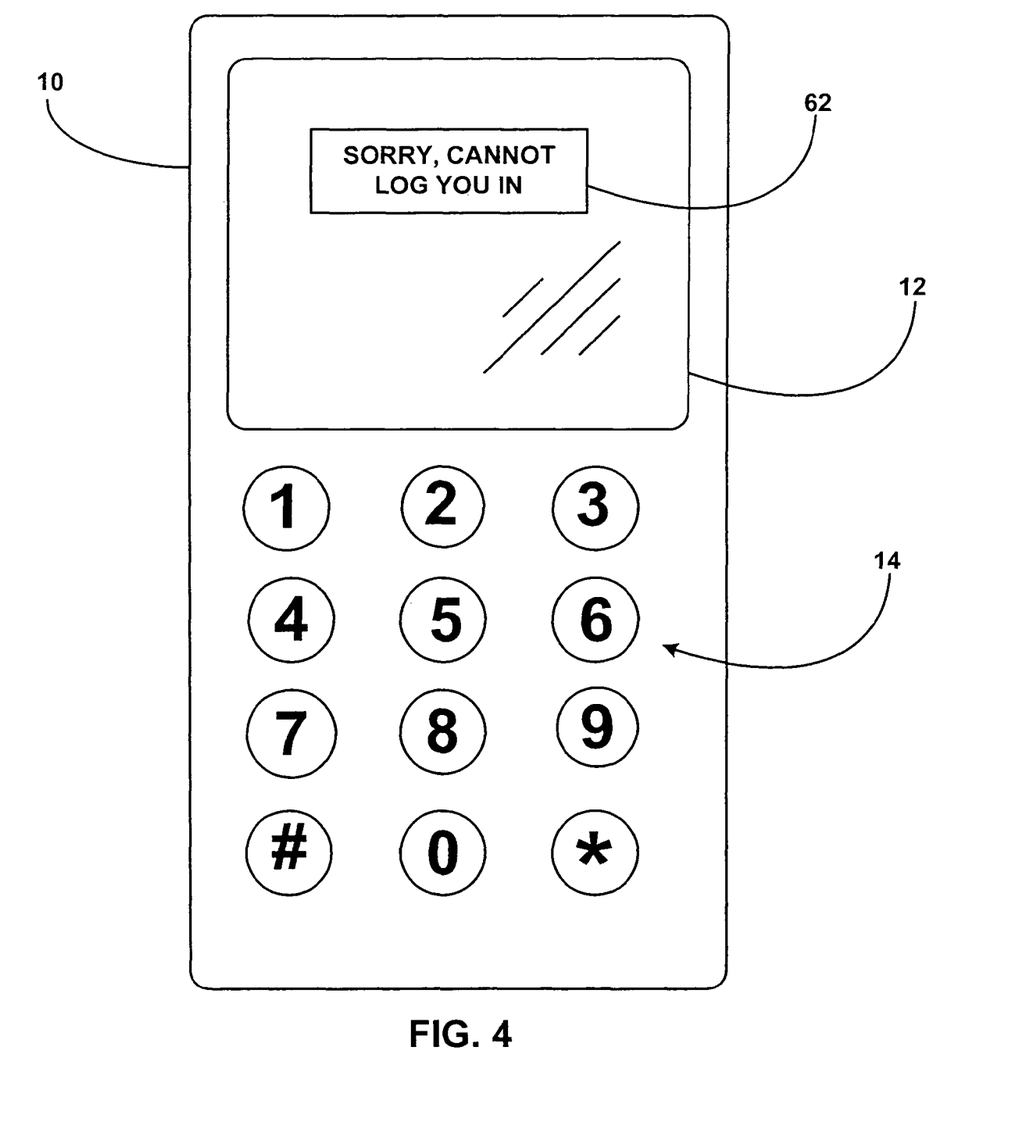
FIG. 4 is an illustration of a wireless communication device showing a login error message appearing on the display, indicating another type of communication problem that may occur.

FIG. 4 is an illustration of a display 12 wireless communication device 10 showing a login error message 62 appearing on the display, indicating another type of communication problem that may occur. Comparing the example of FIG. 4 with the example of FIG. 2, it will be appreciated that no specific prompt is provided in the example of FIG. 4 for triggering the reporting function. However, the client application for reporting communication errors will allow a user to trigger the reporting process by taking some user interface action, such as by pressing a key sequence such as #1 or a particular button, at which time the display would revert to that of FIG. 3 and the user can proceed to indicate the problem.

When the submit icon 60 (FIG. 3) is activated, the application proceeds to extract device and status information, and the URL of the content site that is associated with the problem, as disclosed above, and sends a message (e.g., using the SMS function of the device) to the computer system 36 (FIG. 1) collecting such reports. The application can transmit the problem report in any of a variety of ways to the network entity. In the case of SMS, the application would send the problem report to a predefined SMS address, using well known SMS transmission mechanisms. Another way to send the problem report is via HTTP, though that would assume the device has wireless packet data connectivity, which it might not have, if loss of system connectivity was the cause the problem in the first place. It would be possible to store the message locally in the device and transmit it later when HTTP connectivity with the wireless service provider network is restored later on.

Figure 5:
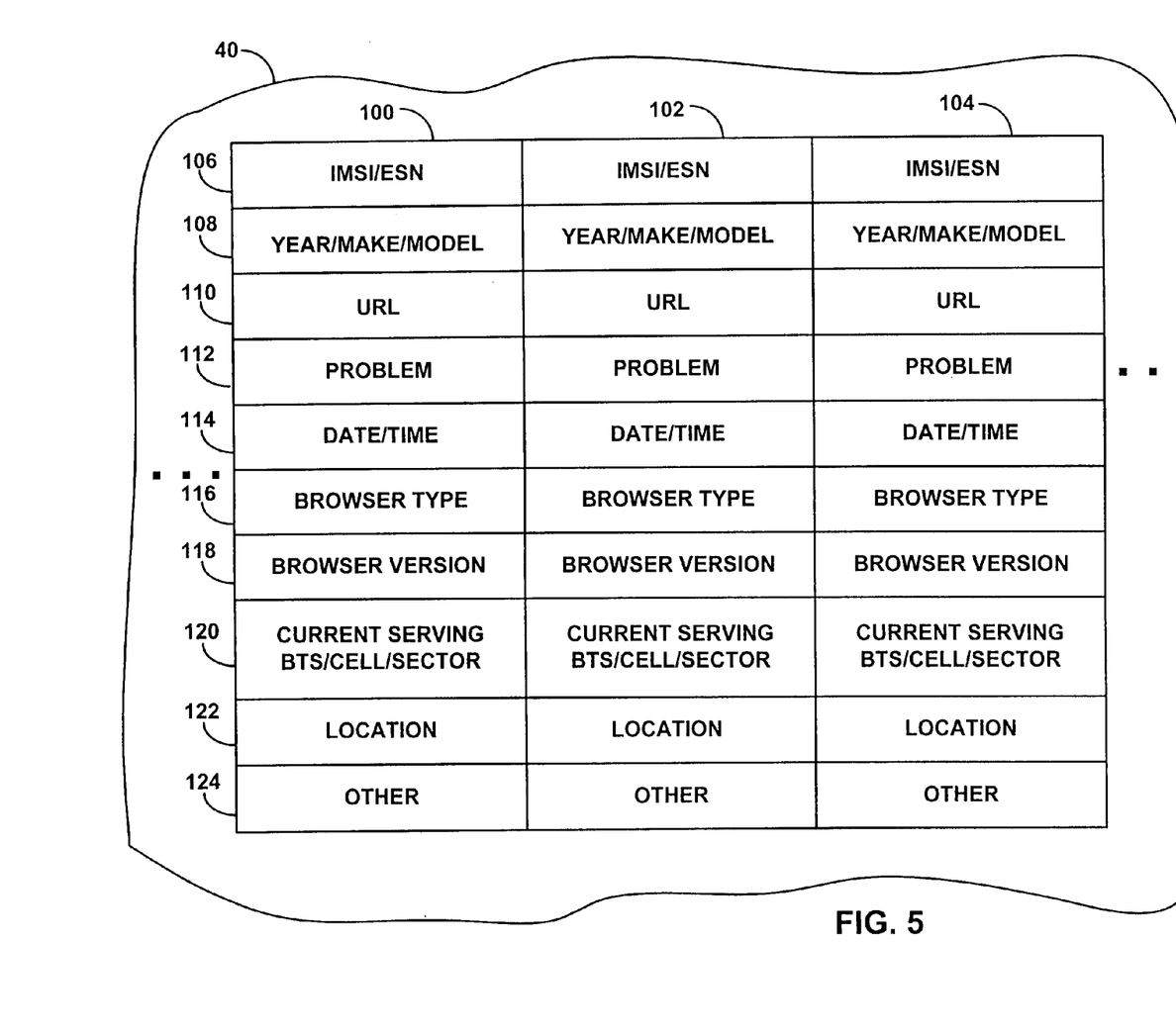
FIG. 5 is a schematic view of the database of FIG. 1 storing a plurality of reports of web site communication problems from a plurality of distributed wireless communications devices.

FIG. 5 is a schematic view of the database 40 of FIG. 1. The database 40 store a plurality of individual reports 100, 102, 104 of web site communication problems from a plurality of distributed wireless communications devices. Each report 100, 102, 104 is a separate instance where a wireless device went through the process of FIG. 3, identified a problem, and a message containing the report of a communication problem was received by the system 36.

Each report 100, 102, 104 etc. consists of data occupying several fields of the database. The description and content of the fields can vary. The example of FIG. 5 includes a field 106 storing the device serial number. Field 108 stores the year, make and model of the device. Field 110 stores the URL or IP address of the web site (or other content site) for which the problem is associated. Field 112 stores a description of the problem, either a bit or flag identifying the selection of a predetermined problem or a text message in the event the user described the problem using the text box of FIG. 3. Field 114 stores the date and time the problem occurred. Field 116 stores the browser type running on the device 10. Field 118 stores the browser version. Field 120 stores information identifying the cell and sector that the device 10 was in communication with at the time the problem was reported. Field 122 indicates the location of the device. Such location could be determined by reference to a table associating cells and sectors to particular geographic coordinates, by reference to GPS positioning information that is included in the report from the wireless device, or by reference to other methods of determining location of wireless devices which are known in the art. Field 124 indicates that other information could also be present in the report.

Figure 6:
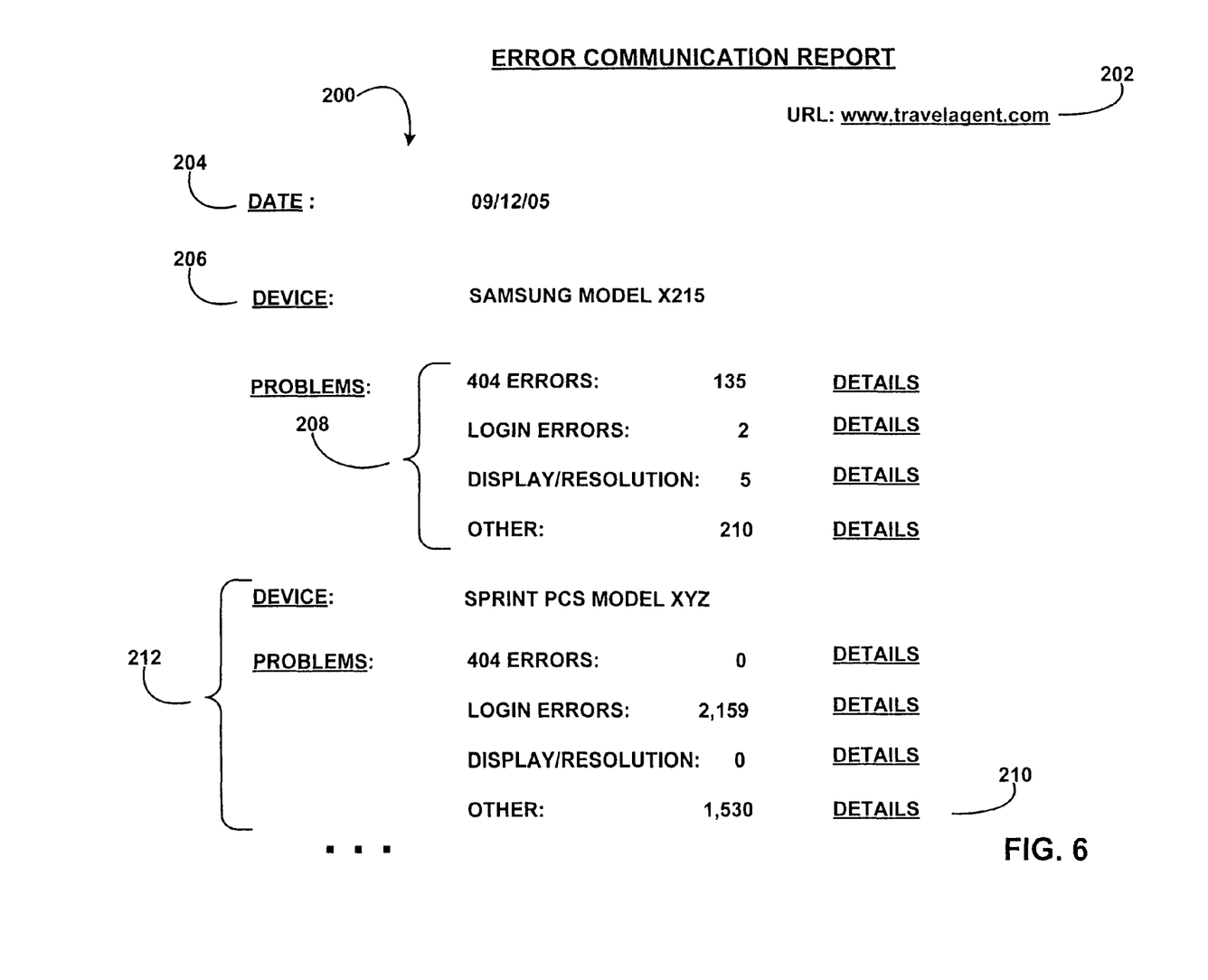
FIG. 6 is an example of an electronic report that the computer system of FIG. 1 may generate and transmit to a content site proprietor, comprising a summary of recently reported communications problems. In one variation, a similar summary is prepared and used internally by a wireless service provider.

As noted above, the server 38 of the central computer system 36 receiving these reports in one embodiment generates reports which may take the form of summaries of the individual reports 100, 102, 104. Such reports can be provided to content site proprietors automatically (e.g., monthly, weekly) or can be used solely for internal purposes of the wireless service provider. In one embodiment, the reports summarize the problems that are being reported by wireless devices 10. Such reports can be generated by a simple sorting process operating on the database of FIG. 5 and applying formatting rules to collect and present the underlying data in a suitable, useable fashion. One example of a report is shown in FIG. 6. The report 200 is a report of errors occurring for a particular web site (202), such as by sorting the entries in the database by URL. The format for presentation of the report can vary widely from the particulars of the example of FIG. 6.

In the example of FIG. 6, the report is sorted by date 204. For each date, the report summarizes the errors by particular make and model of wireless communications device (206). Under each device, the number of instances of particular types of problems are presented as indicated in field 208. The report, which in the example of FIG. 5 is in electronic form, includes a link "Details" which the web site proprietor can click on to go to particular details on the problems.

Figure 7:
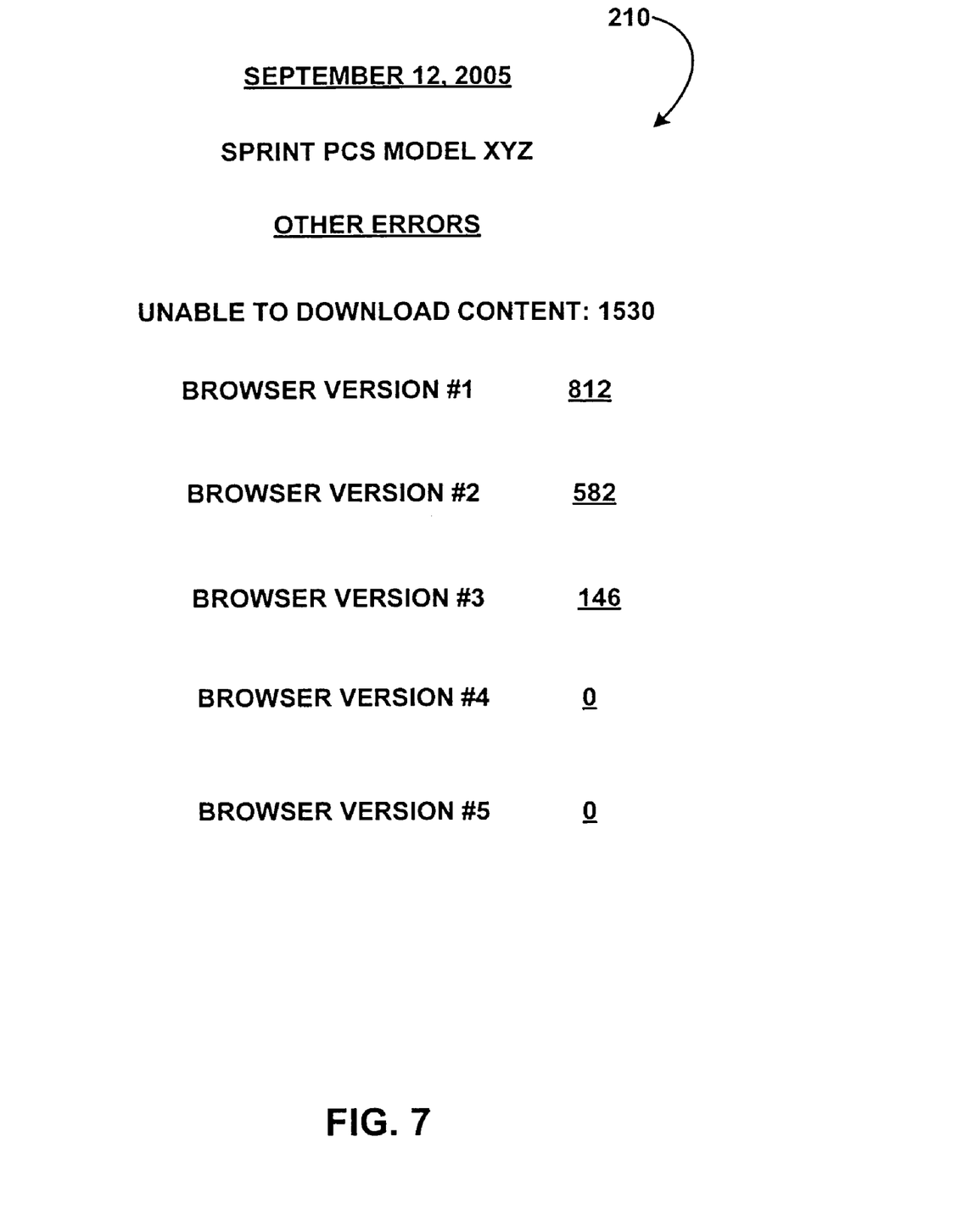
FIG. 7 is an illustration of a description of other areas that may be included in the report of FIG. 6.

There are potentially many fields 212 in the report, each field devoted to a particular type of device. Note in field 212 for the Sprint PCS model XYZ cell phone, there were a large number of login errors and a large number of "other errors", but no 404 errors and no display/resolution errors. If the proprietor wanted to see what the "other" errors were, they would click on the "details" icon 210 and the report would call up the information presented in FIG. 7. In the example of FIG. 7, the errors were "unable to download content", and the data is further sorted by browser version. The data indicates that browser versions 1, 2 and 3 had problems, but there were no problems with browser versions 4 or 5. Hence, the proprietor has detailed information on problems that are occurring with particular browsers of a particular manufacturer of a cell phone. This information can be used to troubleshoot and correct the problem.

Obviously, the examples presented here are but one possibility of how problems can be collected and reported to content site proprietors. The specifics can be expected to change, and such changes being within the scope of this disclosure.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. A method of collecting feedback on user experiences in accessing content on a network via a wireless communications device, comprising the steps of:

receiving a plurality of communications from a plurality of distributed wireless communications devices, each communication including at least (a) identification information as to a wireless communication device, (b) information as to a communication problem occurring when the wireless communication device accessed a web site with a web browser, and (c) information identifying the web site;

storing data from such communications in a computer system;

preparing a summary report of the plurality of communications; and making available the summary report to a proprietor of the web site, wherein the summary report contains information (a) and (b), wherein making available the summary report to the proprietor is triggered when a number of communications of the plurality of communications reporting on problems occurring with the web site exceeds a predetermined threshold, wherein information provided in the summary report comprises at least one of: (1) year, make or model of wireless communication device reporting a problem, (2) a time the problem occurred, (3) a location of the wireless communication device when the problem occurred, (4) a number of occurrences of a type of communication problem, and (5) a browser of a wireless communication device reporting the problem.

2. The method of claim 1, wherein the receiving step is performed by a provider of wireless communications services or a designee thereof.

3. The method of claim 1, wherein the computer system is maintained by a provider of wireless communications services.

4. In a wireless communications device having a processing unit executing machine-readable instructions stored in a memory, the wireless communications device configured for Internet web browsing, the improvement comprising:

providing instructions in the wireless communications device for facilitating reporting communication problems to a computer system remote from the wireless communications device, wherein the communication problems that are reported comprise problems occurring when the wireless communications device interacts with a content site on a network using a web browser, wherein the instructions comprise an interactive application displaying a form on a screen display of the wireless communications device, whereby an operator of the wireless communications device may indicate on the form a type of communication problem that occurred, wherein the form provides a listing of predetermined error conditions and the operator may indicate that one of the predetermined error conditions was experienced, wherein the instructions further comprise instruction for including in a report at least one of: (1) year, make or model of wireless communications device, (2) a browser used by the wireless communications device, (3) a time the problem occurred, (4) a location of the wireless communications device when the problem occurred, (5) an address of a web site for the content site, and (6) a cell or sector in a radio access network the wireless communications device was communicating with at a time the problem occurred.

5. The improvement of claim 4, wherein the computer system is managed by a provider of wireless communication services.

6. The improvement of claim 4, wherein the wireless communications device reports the communication problem to the computer system via a SMS message.

7. The improvement of claim 4, wherein the form provides a space for a user to enter a description of the communication problem.

8. The improvement of claim 4, wherein the error conditions include at least one of (a) web site nonresponsiveness, (b) inability to login, and (c) display or resolution problems.

9. An improvement to a wireless service provider system, comprising:

a computer system receiving and storing communications from a plurality of distributed wireless communications devices, the communications reporting on communications problems occurring when the wireless communications devices access a web site with a web browser;

wherein the computer system further comprises software instructions for processing the communications to thereby generate a summary report of the communications and to make available the summary report to a proprietor of the web site, wherein the summary report contains (a) identification information as to a wireless communications device and (b) information as to a communication problem occurring when the wireless communications device accessed the web site with the web browser, wherein making available the summary report to the proprietor is triggered when a number of communications of the plurality of communications reporting on problems occurring with the web site exceeds a predetermined threshold, wherein the summary report further comprises data indicating at least one of: (1) year, make or model of a wireless communications device reporting a problem with communication with a content site, (2) a time the problem occurred, (3) a location of the wireless communications device when the problem occurred, (4) a number of occurrences of a communication problem; and (5) a browser used by the wireless communications device reporting the problem.

10. The improvement of claim 9, wherein the computer system operates to generate a multitude of reports, each one for a different content site proprietor, each report containing information relating to communication problems reported by wireless communications devices of a particular web site.

11. The improvement of claim 9, wherein the computer system operates to generate a second summary report for internal usage by a wireless service provider.

\* \* \* \* \*